US012774501B2

(12) United States Patent
Hiratsuka et al.

(10) Patent No.: US 12,774,501 B2
(45) Date of Patent: Oct. 27, 2026

(54) METHOD FOR MANUFACTURING STAINLESS STEEL SINTERED MESH

(71) Applicant: NIFCO INC., Yokosuka (JP)

(72) Inventors: Shuichi Hiratsuka, Yokosuka (JP); Norio Saito, Yokosuka (JP)

(73) Assignee: NIFCO INC., Yokosuka (JP)

( * ) Notice: Subject to any disclaimer, the term of this patent is extended or adjusted under 35 U.S.C. 154(b) by 513 days.

(21) Appl. No.: 18/032,294

(22) PCT Filed: Oct. 19, 2021

(86) PCT No.: PCT/JP2021/038583
§ 371 (c)(1),
(2) Date: Apr. 17, 2023

(87) PCT Pub. No.: WO2022/102356
PCT Pub. Date: May 19, 2022

(65) Prior Publication Data

US 2023/0392222 A1 Dec. 7, 2023

(30) Foreign Application Priority Data

Nov. 11, 2020 (JP) ................................. 2020-187946

(51) Int. Cl.
*C21D 1/18* (2006.01)
*B01D 39/20* (2006.01)
(Continued)

(52) U.S. Cl.
CPC ........... *C21D 1/18* (2013.01); *B01D 39/2044* (2013.01); *B21F 27/00* (2013.01); *C21D 1/773* (2013.01);
(Continued)

(58) Field of Classification Search
None
See application file for complete search history.

(56) References Cited

U.S. PATENT DOCUMENTS 2,925,650 A * 2/1960 Pall ......................... B21F 33/00 428/605
4,562,039 A * 12/1985 Koehler ................. B01D 39/12 427/244

(Continued)

FOREIGN PATENT DOCUMENTS

CN 1143534 A * 2/1997
CN 101987267 A * 3/2011

(Continued)

OTHER PUBLICATIONS

JP H01-34537 machine translation of JP S64-34537 cited in applicant's Apr. 17, 2023 IDS. JP S64 and H01 both represent the year 1989. Emperor S died early in 1989, and Emperor H began his reign. (Year: 1989).*

(Continued)

*Primary Examiner* — Stephani Hill
(74) *Attorney, Agent, or Firm* — HAUPTMAN HAM, LLP

(57) ABSTRACT

A method for manufacturing a sintered mesh includes a step of preparing a mesh made of austenite stainless steel and including a plurality of wires extending respectively in intersecting directions, and a step of heat treatment for controlling an ambient temperature of the mesh. The step of heat treatment includes a temperature rising process for raising the ambient temperature to a treatment temperature, a holding process for holding the ambient temperature at the treatment temperature, and a temperature lowing process for lowing the ambient temperature. The treatment temperature is more than an austenitic temperature. The temperature lowering step includes an quenching process, where the ambient temperature is lowered under an argon gas ambient at a temperature lowering speed more than 3° C./min.

8 Claims, 9 Drawing Sheets

(51) Int. Cl.
*B21F 27/00* (2006.01)
*C21D 1/773* (2006.01)
*C21D 6/00* (2006.01)

(52) U.S. Cl.
CPC ........ *C21D 6/004* (2013.01); *C21D 2211/001* (2013.01)

(56) References Cited

U.S. PATENT DOCUMENTS

| | | | | | |
|---|---|---|---|---|---|
| 4,686,342 | A | * | 8/1987 | Collier | C21D 9/50 219/56 |
| 4,687,579 | A | * | 8/1987 | Bergman | B01D 46/54 55/497 |
| 2017/0218542 | A1 | * | 8/2017 | Stewart | D04B 1/225 |

FOREIGN PATENT DOCUMENTS

| | | | | | |
|---|---|---|---|---|---|
| CN | 103418989 A | * | 12/2013 | | |
| CN | 108579209 A | | 9/2018 | | |
| CN | 111519006 A | * | 8/2020 | | C22C 38/38 |
| DE | 102021207206 A1 | * | 1/2023 | | C23C 8/80 |
| JP | S63201062 A | * | 8/1988 | | |
| JP | S64-034537 A | | 2/1989 | | |
| JP | H07-080662 A | | 3/1995 | | |
| JP | H09-071812 A | | 3/1997 | | |
| JP | H0971812 A | * | 3/1997 | | |
| JP | 2000328142 A | | 11/2000 | | |
| JP | 2003268416 A | * | 9/2003 | | |
| JP | 2014057938 A | * | 4/2014 | | |
| JP | 2017-064699 A | | 4/2017 | | |
| KR | 20010090393 A | * | 10/2001 | | C22C 38/18 |
| KR | 20020020537 A | * | 3/2002 | | |
| WO | WO-8912111 A1 | * | 12/1989 | | C21D 1/613 |

OTHER PUBLICATIONS

Sigma Aldrich. Millipore Sigma. Stainless steel 0 AISI 304L alloy, Fe/Cr18/Ni10. https://www.sigmaaldrich.com/US/en/substance/stainlesssteelaisi304lalloyfecr18ni101234598765?srsltid=AfmBOorZ3l9LeVY4hfJIvTGIgmKnDLtWrwvf5htgnLSJtCdBkTjdpNDR. Accessed Sep. 3, 2025. (Year: 2025).*

Notice of Reasons for Refusal for Japanese Application No. 2020-187946 mailed on Nov. 29, 2024; 8 pp.

PCT/ISA/210, "International Search Report for PCT International Application No. PCT/JP2021/038583," Dec. 21, 2021.

Japan Patent Office, Notice of Reasons for Refusal for Japanese Patent Application No. 2020-187946 mailed on Aug. 2, 2024; 6 pp.

* cited by examiner

METHOD FOR MANUFACTURING STAINLESS STEEL SINTERED MESH

RELATED APPLICATIONS

The present application is National Phase of International Application No. PCT/JP2021/038583 filed Oct. 19, 2021, and claims priority from Japanese Application No. 2020-187946, filed Nov. 11, 2020, the disclosure of which is hereby incorporated by reference herein in its entirety.

FIELD OF THE INVENTION

The present invention relates to a method for manufacturing a stainless steel sintered mesh.

BACKGROUND OF THE INVENTION

A filter for removing foreign materials contained in a hydrogen fuel is known. For example, a patent document 1 discloses that a mesh made of stainless steel is used as a filter.

PRIOR ART DOCUMENT

Patent Document

Patent Document 1: Japanese Patent Publication No. 2017-64699

DISCLOSURE OF THE INVENTION

In case a mesh made of stainless steel is used as a filter in an acid condition of a hydrogen fuel battery, there is a fear that the mesh corrodes.

An object of the invention is to provide a method for manufacturing a stainless steel sintered mesh, which can advantageously solve these problems.

The present invention is directed to a method for manufacturing a sintered mesh, which comprises:

- a step of preparing a mesh made of austenite stainless steel and including a plurality of wires extending respectively in intersecting directions, and
- a step of heat treatment for controlling an ambient temperature of the mesh,
- wherein the step of heat treatment includes a temperature rising process for raising an ambient temperature to a treatment temperature, a holding process for holding the ambient temperature at the treatment temperature, and a temperature lowing process for lowing the ambient temperature,
- the treatment temperature is more than an austenitic temperature, and
- the temperature lowering step includes a quenching process, where the ambient temperature is lowered under an argon gas ambient at a temperature lowering speed more than 3° C./min.

In the holding process of the method for manufacturing the sintered mesh according to the invention, an ambient pressure may be less than an atmospheric pressure.

In the temperature lowing process of the method for manufacturing the sintered mesh according to the invention, the argon gas pressure may be more than the atmospheric pressure.

In the method for manufacturing the sintered mesh according to the invention, the treatment temperature may be more than 980° C. and less than 1100° C.

In the method for manufacturing the sintered mesh according to the invention, the sintered mesh may be used for a filter of a hydrogen fuel filter.

Advantage of the Invention

In the method of the invention, corrosion of the sintered mesh can be suppressed.

EMBODIMENTS IMPLEMENTING THE INVENTION

Figure 1:
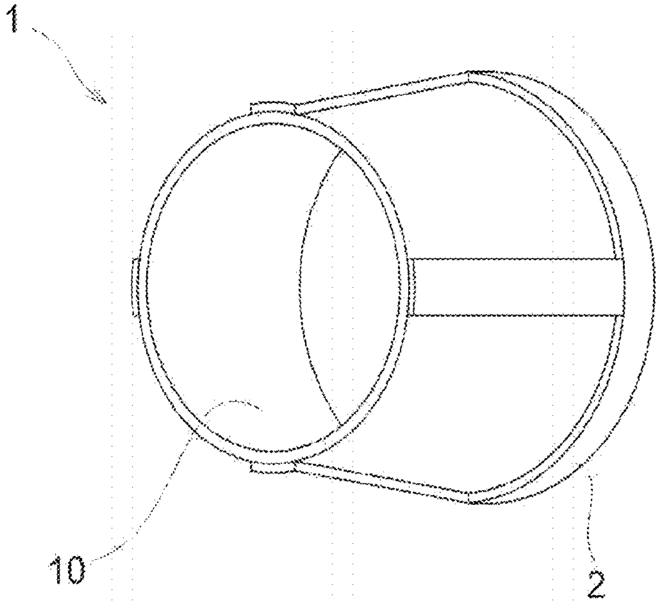
FIG. 1 is a perspective view showing one example of a filter device.

Hereinafter, embodiments of the invention will be explained with reference to the drawings. Incidentally, in the drawings attached to the specification, a scale and a vertical to horizontal dimensional ratio are changed from an actual item for understanding easily.

(Filter Device)

FIG. 1 is a perspective view showing one example of a filter device 1. The filter device 1 is used, for example, as a filter of a hydrogen fuel. The filter device 1 is used, for example, in a fuel cell stack of a hydrogen fuel battery vehicle.

The filter device 1 includes a mesh filter 10, and a case 2 holding the mesh filter 10. The case 2 is, for example, made of resin.

Figure 2:
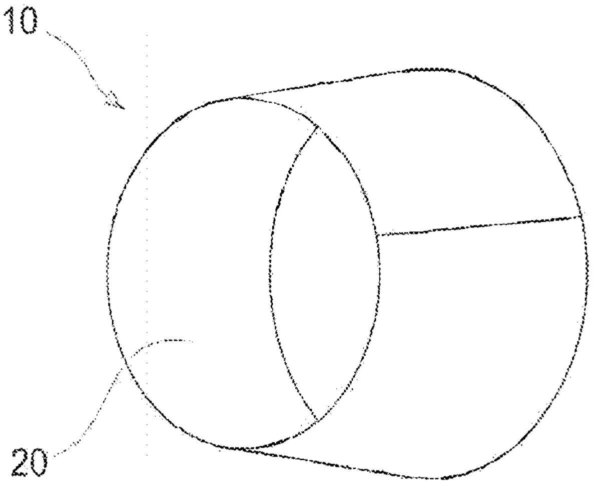
FIG. 2 is a perspective view showing one example of a mesh filer.

FIG. 2 shows a perspective view showing one example of the mesh filter 10. The mesh filter may have a cylindrical side face, and a bottom face. The side face of the mesh filter is formed of a sintered mesh 20.

The hydrogen fuel is, for example, a compressed hydrogen gas. The hydrogen fuel flows an inside of the mesh filter 10 through the sintered mesh 20. When the hydrogen fuel passes through the sintered mesh 20, foreign materials in the hydrogen fuel are caught. The hydrogen fuel flows out from the bottom of the mesh filter 10.

(Sintered Mesh)

Figure 3:
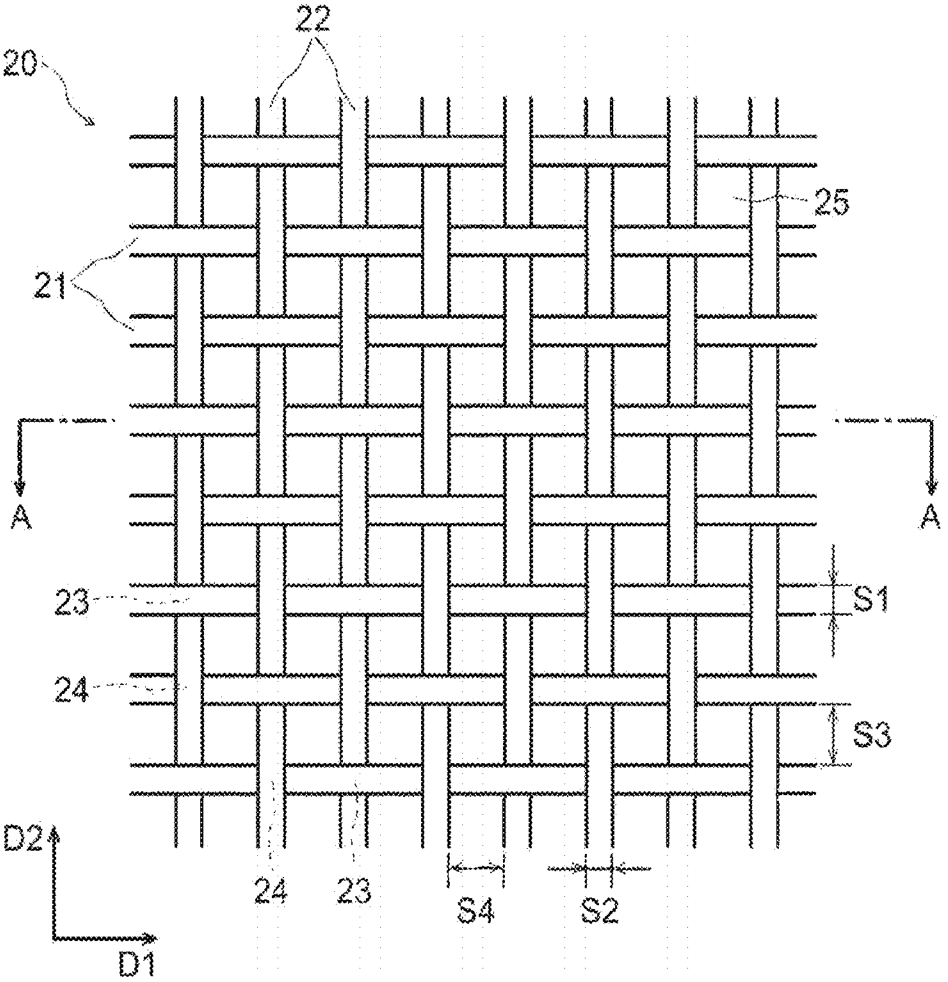
FIG. 3 is a plan view showing one example of a sintered mesh 20.

FIG. 3 shows a plan view showing one example of the sintered mesh 20. The sintered mesh 20 includes a plurality of first wires 21 extending in a first direction D1, and a plurality of second wires 22 extending in a second direction D2 intersecting the first direction D1. The first direction D1 may intersect perpendicularly to the second direction D2.

Figure 4:
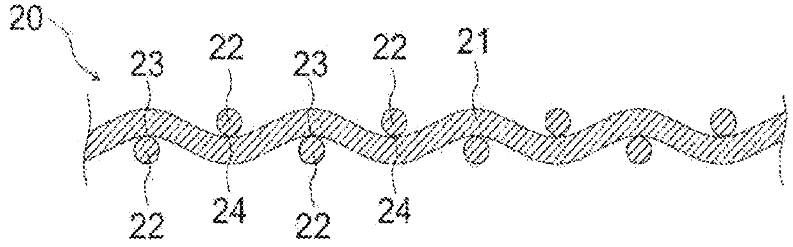
FIG. 4 is a sectional view showing the sintered mesh 20 shown in FIG. 3 from an A-A direction.

FIG. 4 is a cross sectional view of the sintered mesh shown in FIG. 3 seen from an A-A direction. As shown in FIG. 4, the first wire 21 and the second wire 22 may have a circular cross section.

The first wires 21 and the second wires 22 are bonded together by sintering in the up-down direction shown in FIG. 4. Sintering is made by heat treatment to the mesh having the first wires 21 and the second wires 22. Connections by sintering may be made, as shown by numeral 23, in a state that the first wires 21 are located on the second wires 22, or as shown in numeral 24, in a state that the second wires 22 are located on the first wires 21.

As shown in FIG. 3, the first wires 21 and the second wires 22 may be connected such that the first connections 23 and the second connections are alternately aligned in the first direction D1 and the second direction D2. Incidentally, the locations of the first wires 21 and the second wires 22 are not limited to the examples shown in FIG. 3 and FIG. 4.

The sintered mesh 20 includes a space 25 surrounded by two first wires 21 and two second wires 22. When the sintered mesh 20 is used for the filter of the hydrogen fuel, foreign materials greater than the space 25 are caught by the sintered mesh 20.

Numerals S1 and S2 show, respectively, the width of the first wire 21 and the width of the second wire 22. Numeral S3 shows a space between the adjacent two first wires 21. Numeral S4 shows a space between the adjacent two second wires 22. The widths S1, S2 and the spaces S3 and S4 are determined according to the size of the foreign materials to be caught. Preferably, the sintered mesh 20 can catch the foreign materials having a size greater than 200 μm.

The widths S1 and S2 are, for example, more than 30 μm, and may be more than 50 μm and more than 100 μm. The widths S1 and S2 are, for example, less than 500 μm, and may be less than 300 μm and less than 200 μm.

The spaces S3 and S4 are, for example, more than 50 μm, and may be more than 100 μm and more than 150 μm. The spaces S3 and S4 are, for example, less than 500 μm, and may be less than 300 μm and less than 200 μm.

The sintered mesh 20 is made of austenitic stainless steel. Austenitic stainless steel contains less than 0.08 wt % of carbon (C), less than 1.00 wt % of silicon (Si), less than 2.00 wt % of manganese (Mn), less than 0.045 wt % of phosphorus (P), less than 0.030 wt % of sulfur (S), more than 8.00 wt % and less than 15.00 wt % of nickel (Ni), more than 16.00 wt % and less than 20.00 wt % of chromium, less than 3.00 wt % of molybdenum (Mo), and remainder of Iron (Fe), and unavoidable impurities. As the austenitic stainless steel, SUS304. SUS316 and SUS316L may be used. Examples of compositions of SUS304. SUS316 and SUS316L are shown in Table 1. Unit of numerals in Table 1 is wt %.

TABLE 1

| | C | Si | Mn | P | S | Ni | Cr | Mo |
|---|---|---|---|---|---|---|---|---|
| SUS304 | ≤0.08 | ≤1.00 | ≤2.00 | ≤0.045 | ≤0.030 | 8.00~10.50 | 18.00~20.00 | — |
| SUS316 | ≤0.08 | ≤1.00 | ≤2.00 | ≤0.045 | ≤0.030 | 10.00~14.00 | 16.00~18.00 | 2.00~3.00 |
| SUS316L | ≤0.030 | ≤1.00 | ≤2.00 | ≤0.045 | ≤0.030 | 12.00~15.00 | 16.00~18.00 | 2.00~3.00 |

Stainless steel is known as a corrosion resistance material. However, the inventors found that in case a heat treatment condition of the sintered mesh 20 is inappropriate, corrosion may occur on the sintered mesh 20 used as the hydrogen fuel filter. Specifically, it was found that when a heat treatment of the sintered mesh 20 is made under a nitrogen condition, corrosion is likely to occur on the sintered mesh 20.

Following reason is considered as one of the reasons that the sintered mesh 20 corrodes.

In the heat treatment, a sintered mesh 20 is held for a predetermined time at a treatment temperature more than an austenitization temperature. When the temperature is raised from a normal temperature to a treatment temperature, or when an ambient temperature is lowered from the treatment temperature to the normal temperature, the sintered mesh 20 is exposed to an ambient temperature where nitride or carbide is likely to precipitate. Therefore, in case the ambient includes a nitrogen gas, chromium nitride may be formed at crystal grain boundaries by intrusion of nitride atoms inside the sintered mesh 20. If chromium nitride is formed, chromium concentration is lowered in the austenitic organization around the chromium nitride. In case the chromium concentration is lowered, resistance to corrosion is lowered. As a result, corrosion may occur in the sintered mesh 20 used as a filter under an acid environment in a hydrogen fuel battery. In the explanation herein below, an austenitic organization having a lowered chromium concentration is called as chromium deficiency layer.

Incidentally, the above reason is one example. In case the sintered mesh 20 is corroded by other reasons, significance of the invention is not lost.

When the sintered mesh 20 is used as a filter for a hydrogen fuel, the sinter mesh 20 is required to capture small foreign materials. Thus, the widths S1, S2 of the first wires 21 and the second wires 22 become small. As the widths S1, S2 become smaller, ratio of the surface area relative to a volume of the wires 21, 22 becomes higher. As a result, in the heat treatment, a chromium deficiency layer is likely to occur.

In order to solve the problems, in the present invention, it is proposed to carry out the heat treatment under an argon gas ambient. Herein below, a method for manufacturing the sintered mesh 20 is explained.

(Method for Manufacturing Sintered Mesh)

First, a mesh including first wires 21 and second wires 22 is prepared. The first wires 21 and the second wires 22 may be connected together already by sintering, or may not be connected together.

Then, a heat processing for controlling an ambient temperature for the mesh is carried out. For example, in a state where the mesh is placed in a furnace, an ambient temperature in the furnace is controlled. A form of the mesh when the heat treatment is made is arbitrary. For example, the mesh sheet is wrapped in a roll form, and the heat treatment may be made to the roll.

Figure 5:
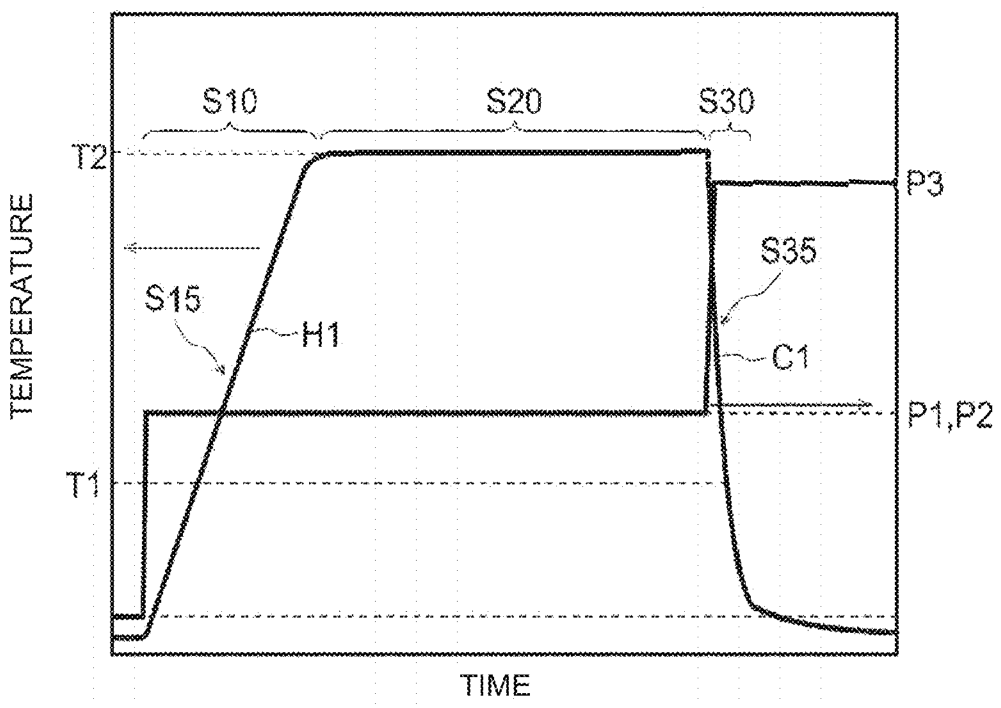
FIG. 5 is a figure showing one example of a heat treatment process.

FIG. 5 is a figure showing one example of a heat treatment process. A horizontal axis in FIG. 5 indicates a time, a left vertical axis shows an ambient temperature, and a right vertical axis shows an ambient pressure. In case the ambient is replaced by an argon gas, the ambient pressure is a pressure of the argon gas. The heat treatment process includes a temperature raising process S10, a holding process S20, and a temperature lowing process S30. Hereinafter, respective processes are explained.

In the temperature raising process S10, an ambient temperature is raised from a normal temperature to a processing temperature T2. The processing temperature T2 is above the austenitization temperature. In the processing temperature T2, the austenite texture in the austenitic stainless steel can stably exist. For example, the processing temperature T2 is above 980° C., and may be above 1020° C. The processing temperature T2 is, for example, below 1100° C., and may be below 1060° C.

In a specific temperature range, for example, in the temperature range more than 500° C. and less than 800° C., a nitride or carbide of chromium is likely to precipitate on the austenitic stainless steel. The temperature range where the nitride or carbide is likely to precipitate is also called as a precipitation temperature range. A lower limit of the precipitation temperature range may be called as a precipitation temperature T1. For example, the precipitation temperature T1 is 500° C.

The temperature rising process S10 may include a rapid heat process S15 wherein an ambient temperature is raised at a raising temperature H1 of more than 5° C./min Thereby, it is possible to quickly pass the precipitation temperature range. As a result, generation of nitride or carbide of chromium on the mesh during the rising process S10 can be suppressed. The rising temperature H1 is calculated by dividing the difference between the processing temperature T2 and the precipitation temperature T1 with a time required from the time where the precipitation time T1 rises to the processing temperature T2. The rising temperature H1 may be more than 10° C./min., and 20° C./min.

The temperature rising process S10 is carried out under an argon gas atmosphere having a first pressure P1. The first pressure P1 may be, for example, more than 10 Pa and more than 50 Pa. The first pressure P1 may be, for example, less than 1 kPa, and less than 300 Pa.

In the holding process S20, the ambient temperature is held at the processing temperature T2 for a predetermined time. In the processing temperature T2, elements, such as chromium, nickel, carbon and nitride, are solid-melted into the austenitic organization. Thus, even if a nitride or carbide of chromium is generated in the mesh, in the holding process S20, the constitute elements of nitride or carbide can be solid-melted into the austenitic organization. Accordingly, it is possible to suppress existence of the chromium deficiency layer.

The time for keeping the ambient temperature to the processing temperature T2 is, for example, more than 30 minutes, and may be more than 45 minutes. The elements, such as chromium, nickel, carbon, nitride and so on, can be solid-melted into the austenite organization by keeping the holding time more than 30 minutes. The holding time is, for example less than 90 minutes, and may be less than 60 minutes. By keeping the holding time less than 90 minutes, it is possible to suppress the connection of the sheet mesh, which is wrapped in the roll form.

The holding process S20 is carried out under the ambient of an argon gas having the second pressure P2. The second pressure P2 may be, for example, more than 10 Pa, and may be more than 50 Pa. The second pressure P2 may be less than the atmospheric pressure. The second pressure may be, for example, less than 1 kPa, and less than 300 Pa.

In the temperature lowing process S30, an ambient temperature is lowed from the processing temperature T2 to a normal temperature. The temperature lowing process S30 may include a quenching process S35 lowering the ambient temperature at a temperature lowering speed C1 more than 3° C./min. Therefore, it is possible to quickly pass the precipitation temperature range. Accordingly, it is possible to suppress generation of nitride or carbide of chromium in the mesh during the temperature lowing process S30. The temperature lowing speed C1 is calculated by dividing a difference between the processing temperature T2 and the precipitation temperature T1 with a time required until the ambient temperature lowers from the processing temperature T2 to the precipitation temperature T1. The temperature lowing speed C1 may be more than 5° C./min., more than 10° C./min., more than 20° C./min., more than 50° C./min. or 100° C./min.

The temperature lowering process S30 may be carried out under an ambient of an argon gas having the third pressure P3. The third pressure P3 may be more than the atmospheric pressure. The third pressure P3 is, for example, more than 110 kPa, and more than 150 kPa. The third pressure P3 may be, for example, less than 600 kPa, and less than 200 kPa.

Figure 6:
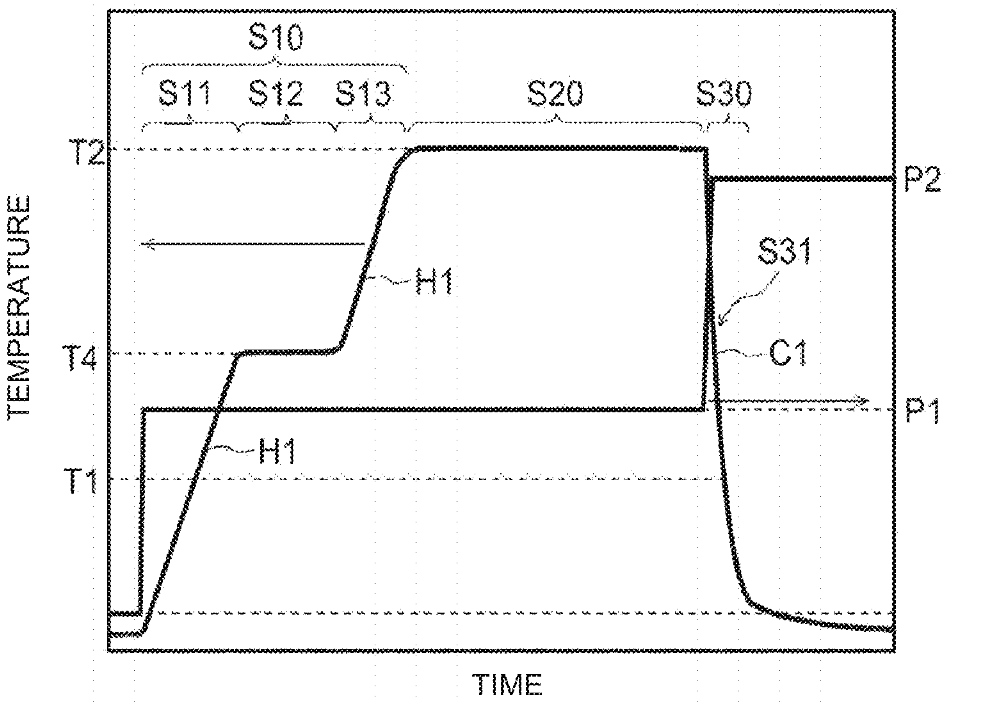
FIG. 6 is a figure showing another example of the heat treatment process.

FIG. 6 shows a figure showing another embodiment of the heat treatment process. As shown in FIG. 6, the temperature rising process S10 may include a first temperature rising process S11, a holding process S12, and a second temperature rising process S13. In the first temperature rising process S11, an ambient temperature is raised from a normal temperature to a holding temperature T4. In the holding process S12, the ambient temperature is kept for a predetermined time at the holding temperature T4. In the second temperature rising process S13, the ambient temperature is raised from the holding temperature T4 to the processing temperature T2.

In case a heating process is carried out for a plurality of rolls at the same time, a temperatures of the rolls may be different according to positions of the rolls. In this case, according to the positions of the rolls, a timing reaching the temperature of the roll to the processing temperature T2 may be different. Since the temperature rising process S10 includes the holding process S12, it is possible to suppress the difference of the timing until the roll temperature reaches the processing temperature T2 according to the positions of the rolls. The holding temperature T4 is, for example, more than 500° C. and less than 900° C.

In accordance with the embodiments of the invention, the temperature lowing process is carried out under ambient of the argon gas, so that it is possible to suppress the formation of the nitride or carbide of chromium to the sintered mesh 20. Accordingly, it is possible to suppress the formation of the chromium deficiency layer in the sintered mesh 20. Therefore, it is possible to suppress formation of corrosion in the sintered mesh 20, which is used for a filter under the acid condition of the hydrogen fuel battery.

Incidentally, usage of the sintered mesh 20 is not limited to the filter for the hydrogen fuel battery. The sintered mesh 20 of the embodiment may be used under other environment where corrosion is likely to occur.

EXAMPLES

Next, the present invention is further explained specifically with reference to the examples, but the invention is not limited to the following examples as long as the invention does not extend the subject thereof.

Example 1

Figure 7:
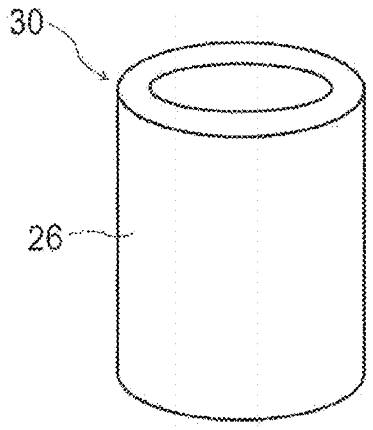
FIG. 7 is a figure showing a roll including a mesh.

First, a mesh sheet including the first wires 21 and the second wires was prepared. The width of the mesh sheet was 50 mm, and the length was 10 m. The widths S1, S2 of the first wires 21 and the second wires 22 were 50 μm. In case a sectional face of each of the first wires 21 and the second wires 22 is circular, the widths S1, S2 are, so called wire diameters. Next, as shown in FIG. 7, the mesh sheet 26 was wrapped in the roll form. As a material for the mesh sheet 26, SUS316L including 0.01 wt % of carbon was used.

Figure 8:
FIG. 8 is a figure showing one example of a heat treatment method.

Next, as shown in FIG. 8, a roll 30 of the mesh sheet 26 was placed in a retaining device 40. The retaining device 40 included a first retaining device 41, a second retaining device 42, a third retaining device 43, and a fourth retaining device 44, laminated in this order from a bottom. 25 of the rolls 30 were arranged in each of the retaining devices 41-44.

Figure 9:
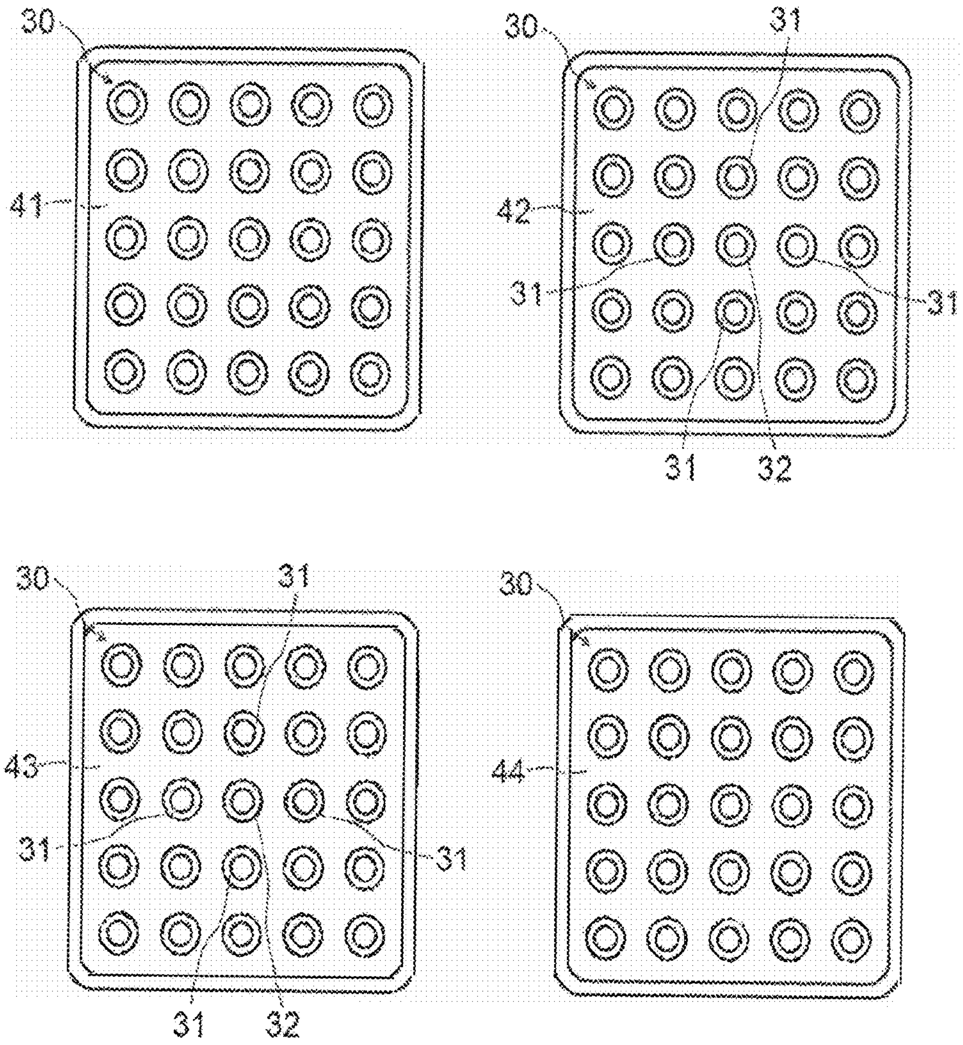
FIG. 9 is a figure of one example of an arrangement of the roll in the heat processing procedure.

FIG. 9 shows the arrangements of the rolls 30 in each of the retaining devices 41-44. As shown in FIG. 9, the rolls 30 in 5 columns×5 rows were arranged in the respective retaining devices 41-44. In the later evaluation, the roll with numeral 31 in FIG. 9 was used as an evaluation roll. Also, the roll with numeral 32 was used for a monitor measuring the ambient temperature of the furnace. The evaluation rolls 31 and 32 were placed in the center of the second retaining device 42 and the third retaining device 43.

Next, in a condition where the retaining device 40 was arranged in a furnace in which an ambient was replaced with an argon gas, an ambient temperature in the furnace was controlled. Thereby, a heat treatment was applied to the rolls 30. As a temperature profile for the heat treatment, the temperature profile shown in FIG. 6 was used. Conditions for the heat treatment were as follows:

Temperature rising speed H1 at the temperature rising process S10: 20° C./min.

Holding temperature T4 at the holding process S12: 860° C. (retain 30 minutes)

Treatment temperature T2 at the holding process S20: 1100° C. (retain 60 minutes)

Argon gas pressure at the holding process S20: 100 Pa

Temperature lowing speed C1 at the temperature lowing process S30: 100° C./min.

Argon gas pressure at the temperature lowing process S30: 200 kPa

Immersion evaluation and etching evaluation were applied to the sintered mesh 20 obtained by the heating processes.

Figure 10:
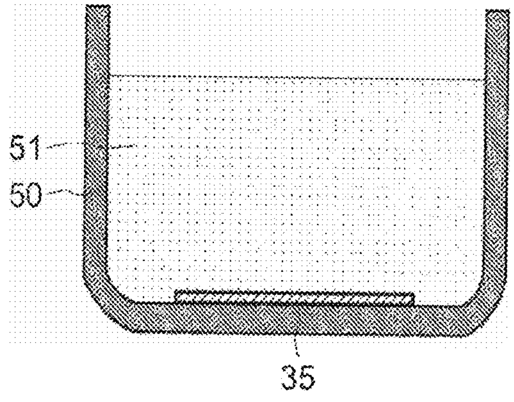
FIG. 10 is a figure explaining an immersion test.

In the immersion evaluation, as shown in FIG. 10, a liquid 51 retained in a container 50 was prepared. The liquid 51 was an acidic liquid including a sulfuric acid. Ph of the acidic liquid was 4.1. Next, in a state where a temperature of the liquid 51 was controlled at 80° C., samples 35 cut from the sintered mesh 20 were immersed in the liquid 51 for 16 hours. Thereafter, it was visually confirmed if discoloration occurred to the samples 35. No discoloration was found.

Figure 11:
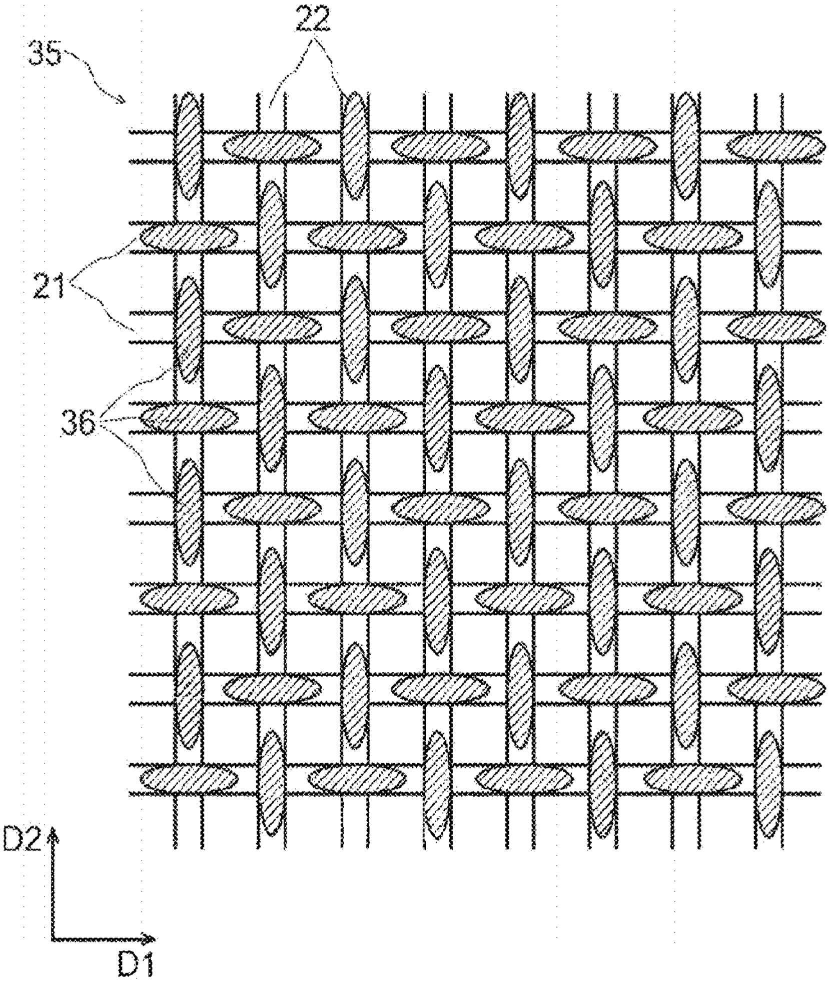
FIG. 11 is a figure explaining an etching test.

In the etching evaluation, the sample 35 was evaluated according to "Oxalic acid etching test method for stainless steel" by JIS G0571:2003. First, as shown in FIG. 11, each test surface 36 was formed on the surface of the first wires 21 and the second wires 22 by grinding the surface of the sample 35. Next, the sample 35 was immersed in a 10% oxalic acid solution. Next, the sample 35 was electrolytic-etched using the test surface 36 as an anode. Then, the surface of the sample 35 was observed by a scanning electron microscope.

Figure 12:
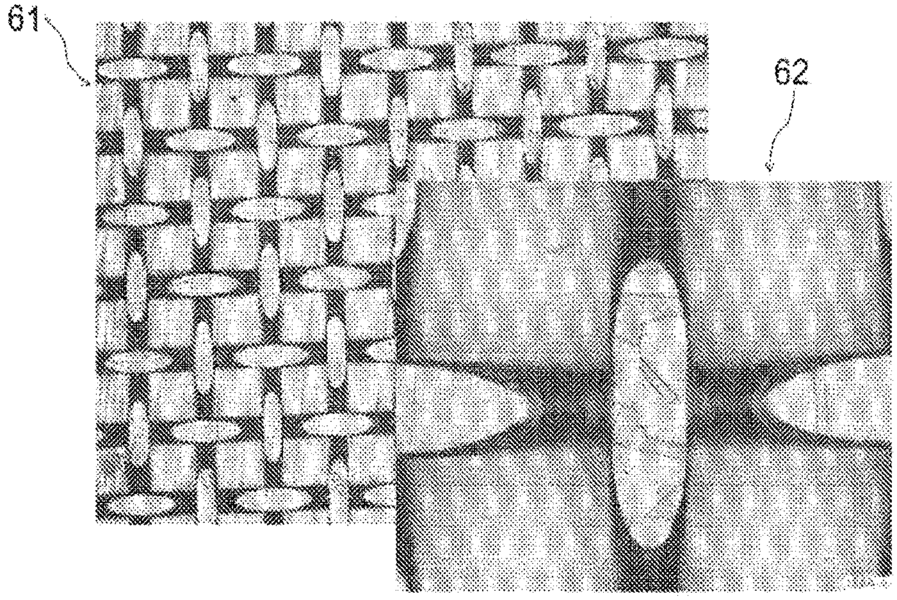
FIG. 12 is a figure showing an observation result of a sample of Example 1.

An observation result is shown in FIG. 12. A first image with a numeral 61 corresponds to the condition shown in FIG. 11. A second image with a numeral 62 is a view with one portion of the image being enlarged. As shown in the second image 62, no sharpening occurred.

Example 2

As in the Example 1, a roll 30 of a mesh sheet 26 was made using SUS 316L containing 0.01 wt % of carbon. The widths S1, S2 of the first wires 21 and the second wires 22 were 50 μm. Next, as in the Example 1, a heat treatment was carried out for the roll 30 using the retaining device 40. As a temperature profile for the heat treatment, the temperature profile shown in FIG. 6 was used. The conditions of the heat treatment are shown below.

Temperature rising speed H1 at the temperature rising process S10: 20° C./min.

Holding temperature T4 at the holding process S12: 860° C. (retain 30 minutes)

Treatment temperature T2 at the holding process S20: 1100° C. (retain 60 minutes)

Argon gas pressure at the holding process S20: 100 Pa

Figure 13:
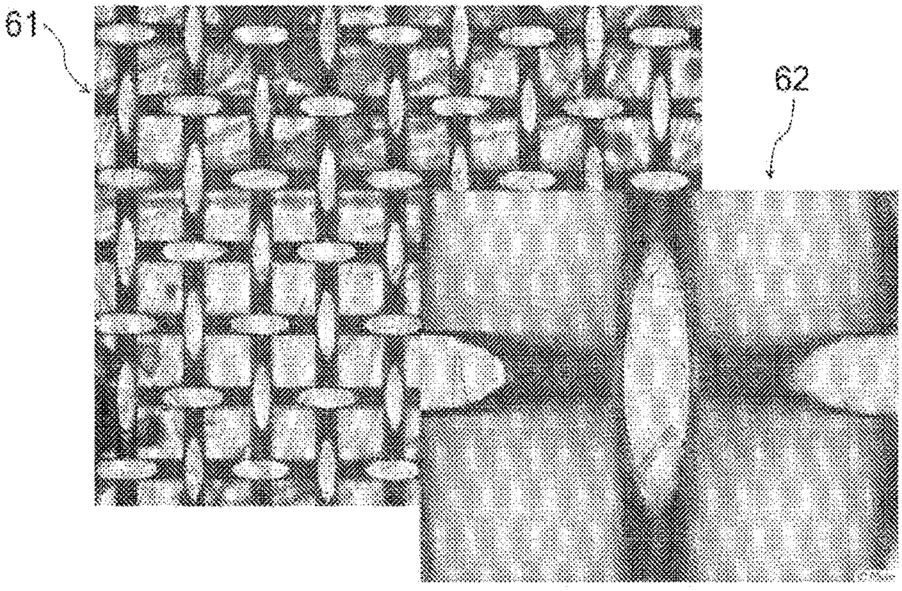
FIG. 13 is a figure showing an observation result of a sample of Example 2.

Temperature lowing speed C1 at the temperature lowing process S30: 65° C./min Argon gas pressure at the temperature lowing process S30: 110 kPa As in the Example 1, the immersion evaluation and the etching evaluation were carried out for the sintered mesh 20 obtained by the heat treatment. In the immersion evaluation, no discoloration was observed. An image obtained by the etching evaluation is shown in FIG. 13. As shown in a second image 62, no sharpening occurred.

Example 3

As in the Example 1, a roll 30 of a mesh sheet 26 was made using SUS 316L containing 0.01 wt % of carbon. The widths S1, S2 of the first wires 21 and the second wires 22 were 50 μm. Next, as in the Example 1, a heat treatment was carried out for the roll 30 using the retaining device 40. As a temperature profile for the heat treatment, the temperature profile shown in FIG. 6 was used. The conditions of the heat treatment are shown below.

Temperature rising speed H1 at the temperature rising process S10: 20° C./min.

Holding temperature T4 at the holding process S12: 860° C. (retain 30 minutes)

Treatment temperature T2 at the holding process S20: 1100° C. (retain 60 minutes)

Argon gas pressure at the holding process S20: 100 Pa

Figure 14:
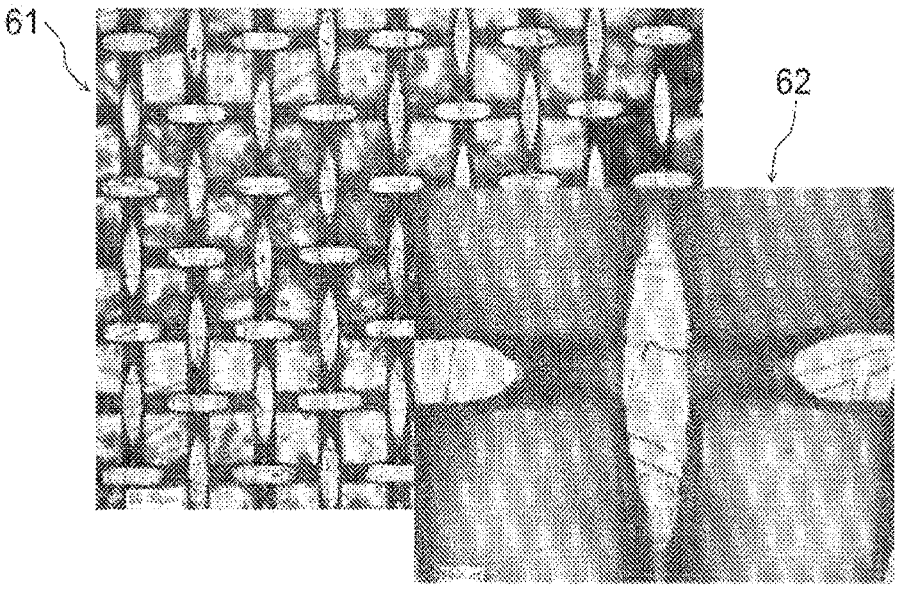
FIG. 14 is a figure showing an observation result of a sample of Example 3.

Temperature lowing speed C1 at the temperature lowing process S30: 3.3° C./min Argon gas pressure at the temperature lowing process S30: 110 kPa As in the Example 1, the immersion evaluation and the etching evaluation were carried out for the sintered mesh 20 obtained by the heat treatment. In the immersion evaluation, no discolorations were observed. An image obtained by the etching evaluation is shown in FIG. 14. As shown in a second image 62, no sharpening occurred.

Example 4

As in the Example 1, a roll 30 of the mesh sheet 26 was made using SUS 316L containing 0.01 wt % of carbon. The widths S1, S2 of the first wires 21 and the second wires 22 were 50 µm. Next, as in the Example 1, a heat treatment was carried out for the roll 30 using the retaining device 40. As a temperature profile for the heat treatment, the temperature profile shown in FIG. 6 was used. The conditions of the heat treatment are shown below.

Temperature rising speed H1 at the temperature rising process S10: 10° C./min.

Holding temperature T4 at the holding process S12: 600° C. (retain 30 minutes)

Treatment temperature T2 at the holding process S20: 1020° C. (retain 60 minutes)

Argon gas pressure at the holding process S20: 100 Pa

Temperature lowing speed C1 at the temperature lowing process S30: 100° C./min.

Argon gas pressure at the temperature lowing process S30: 200 kPa

Figure 15:
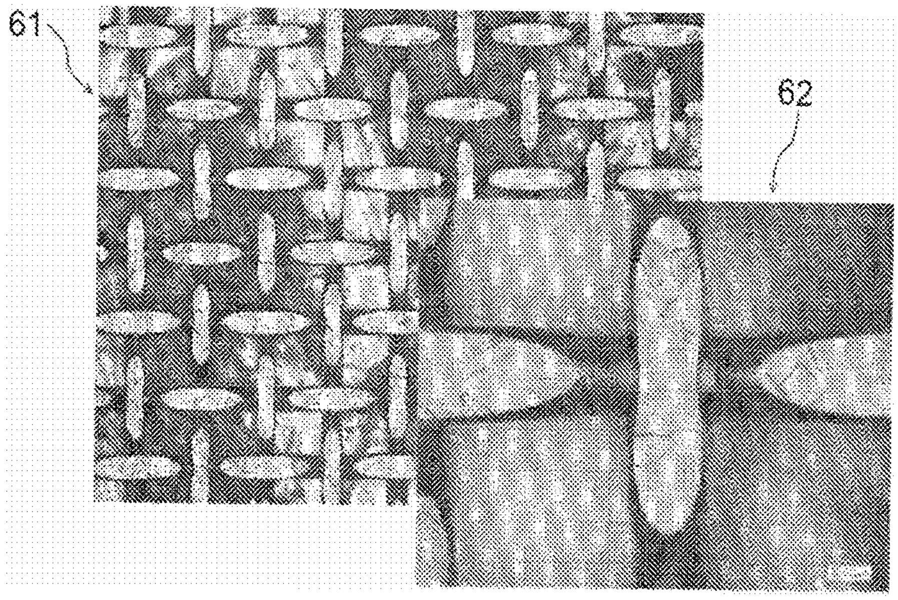
FIG. 15 is a figure showing an observation result of a sample of Example 4.

As in the Example 1, the immersion evaluation and the etching evaluation were carried out for the sintered mesh 20 obtained by the heat treatment. In the immersion evaluation, no discolorations were observed. An image obtained by the etching evaluation is shown in FIG. 15. As shown in a second image 62, no sharpening occurred.

Example 5

Except for using SUS 316 containing 0.04 wt % of carbon, as in the Example 1, a roll 30 of the mesh sheet 26 was made. The widths S1, S2 of the first wires 21 and the second wires 22 were 50 µm. Next, as in the Example 1, a heat treatment was carried out for the roll 30 using the retaining device 40. As a temperature profile for the heat treatment, the temperature profile shown in FIG. 6 was used. The conditions of the heat treatment are shown below.

Temperature rising speed H1 at the temperature rising process S10: 20° C./min.

Holding temperature T4 at the holding process S12: 860° C. (retain 30 minutes)

Treatment temperature T2 at the holding process S20: 1100° C. (retain 60 minutes)

Argon gas pressure at the holding process S20: 100 Pa

Temperature lowing speed C1 at the temperature lowing process S30: 100° C./min.

Argon gas pressure at the temperature lowing process S30: 200 kPa

Figure 16:
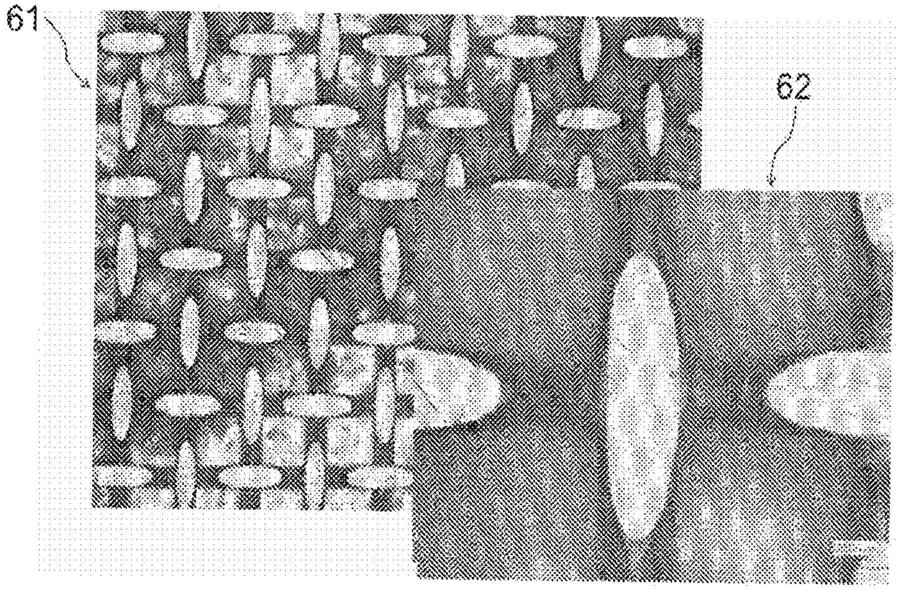
FIG. 16 is a figure showing an observation result of a sample of Example 5.

As in the Example 1, the immersion evaluation and the etching evaluation were carried out for the sintered mesh 20 obtained by the heat processing. In the immersion evaluation, no discolorations were observed. An image obtained by the etching evaluation is shown in FIG. 16. As shown in a second image 62, no sharpening occurred.

Comparative Example 1

As in the Example 1, a roll 30 of a mesh sheet 26 was made using SUS 316L containing 0.01 wt % of carbon. The widths S1, S2 of the first wires 21 and the second wires 22 were 50 µm. Next, a heat treatment was carried out for the roll 30 using the retaining device 40. As a temperature profile for the heat treatment, the temperature profile shown in FIG. 6 was used. The temperature lowing process S30 was carried out in an ambient replaced with a nitrogen gas. The conditions of the heat treatment are shown below.

Temperature rising speed H1 at the temperature rising process S10: 20° C./min.

Holding temperature T4 at the holding process S12: 860° C. (retain 30 minutes)

Treatment temperature T2 at the holding process S20: 1100° C. (retain 60 minutes)

Temperature lowing speed C1 at the temperature lowing process S30: 100° C./min.

Nitrogen gas pressure at the temperature lowing process S30: 200 kPa

Figure 17:
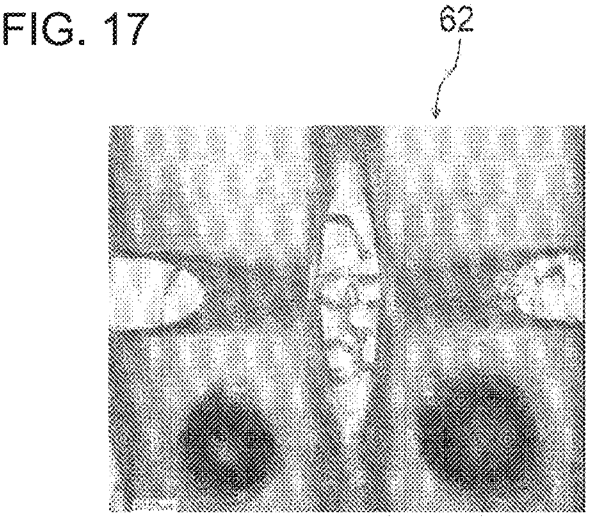
FIG. 17 is a figure showing an observation result of a sample of Comparative Example 1.

As in the Example 1, the immersion evaluation and the etching evaluation were carried out for the sintered mesh 20 obtained by the heat processing. In the immersion evaluation, no discolorations were observed. An image obtained by the etching evaluation is shown in FIG. 17. As shown in a second image 62, sharpening occurred.

Comparative Example 2

As in the Example 5, a roll 30 of a mesh sheet 26 was made using SUS 316 containing 0.04 wt % of carbon. The widths S1, S2 of the first wires 21 and the second wires 22 were 50 µm. Next, a heat treatment was carried out for the roll 30 using the retaining device 40. As a temperature profile for the heat treatment, the temperature profile shown in FIG. 5 was used. The temperature lowing process S30 was carried out in an ambient replaced with a nitrogen gas. The conditions of the heat treatment are shown below.

Temperature rising speed H1 at the temperature rising process S10: 20° C./min.

Treatment temperature T2 at the holding process S20: 1100° C. (retain 60 minutes)

Temperature lowing speed C1 at the temperature lowing process S30: 200° C./min.

Nitrogen gas pressure at the temperature lowing process S30: 200 kPa

Figure 18:
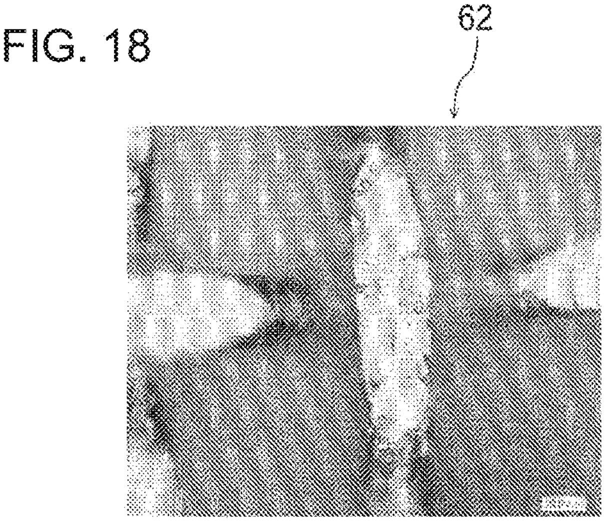
FIG. 18 is a figure showing an observation result of a sample of Comparative Example 2.

As in the Example 1, the immersion evaluation and the etching evaluation were carried out for the sintered mesh 20 obtained by the heat treatment. In the immersion evaluation, no discolorations were observed. An image obtained by the etching evaluation is shown in FIG. 18. As shown in a second image 62, sharpening occurred.

EXPLANATION OF NUMERALS

1 Filter device
2 Case
10 Mesh filter
20 Sintered mesh
21 First wire
22 Second wire
30 Roll
31 Roll for evaluation
32 Roll for monitor
35 Sample
36 Test face

What is claimed is:

1. A method for manufacturing a sintered mesh, comprising:

a step of preparing a mesh made of austenite stainless steel and including a plurality of wires extending respectively in intersecting directions, and a step of heat treatment for controlling an ambient temperature of the mesh, wherein the step of heat treatment includes a temperature rising process for raising the ambient temperature to a treatment temperature, a holding process for holding the ambient temperature at 1100° C. for more than 30 minutes and less than 90 minutes, and a temperature lowering process for lowering the ambient temperature, the temperature lowering step includes a quenching process, where the ambient temperature is lowered under an argon gas ambient at a temperature lowering speed more than 3° C./min, in the holding process, the argon gas pressure is 100 Pa, and in the temperature lowering process, the argon gas pressure is more than 110 kPa and less than 200 kPa.

2. A method of manufacturing a sintered mesh according to claim 1, wherein in the holding process, the ambient temperature is held at 1100° C. for more than 45 minutes and less than 60 minutes.

3. A method for manufacturing a sintered mesh, comprising:

a step of preparing a mesh made of austenite stainless steel and including a plurality of wires extending respectively in intersecting directions, and a step of heat treatment for controlling an ambient temperature of the mesh, wherein the step of heat treatment includes a temperature rising process for raising the ambient temperature to a treatment temperature, a holding process for holding the ambient temperature at 1100° C. for more than 30 minutes and less than 90 minutes, and a temperature lowering process for lowering the ambient temperature, the temperature lowering step includes a quenching process, where the ambient temperature is lowered under an argon gas ambient at a temperature lowering speed more than 3° C./min, and in the temperature rising process, the ambient temperature is raised at a raising temperature of more than 5° C./min, and wherein in the holding process, the argon gas pressure is 100 Pa, and in the temperature lowering process, the argon gas pressure is more than 110 kPa and less than 200 kPa.

4. A method for manufacturing a sintered mesh according to claim 3, wherein each of the plurality of wires has a width within a range more than 30 μm and less than 500 μm.

5. A method for manufacturing a sintered mesh according to claim 3, wherein the method further comprising sintering the plurality of wires of the mesh to be bonded together with one another.

6. A method of manufacturing a sintered mesh according to claim 3, wherein each of the plurality of wires has a width within a range more than 50 μm and less than 300 μm.

7. A method of manufacturing a sintered mesh according to claim 3, wherein each of the plurality of wires has a width within a range more than 100 μm and less than 200 μm.

8. A method of manufacturing a sintered mesh according to claim 3, wherein in the holding process, the ambient temperature is held at 1100° C. for more than 45 minutes and less than 60 minutes.

* * * * *